(12) United States Patent
Prasad et al.

(10) Patent No.: US 8,140,024 B2
(45) Date of Patent: Mar. 20, 2012

(54) FAST CONVERGENCE TO OPTIMAL BEAM PATTERNS

(75) Inventors: Narayan Prasad, Monmouth Junction, NJ (US); Kishore Ramachandran, North Brunswick, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 120 days.

(21) Appl. No.: 12/825,693

(22) Filed: Jun. 29, 2010

(65) Prior Publication Data

US 2010/0330928 A1 Dec. 30, 2010

Related U.S. Application Data

(60) Provisional application No. 61/221,275, filed on Jun. 29, 2009.

(51) Int. Cl.
*H04B 1/00* (2006.01)
*H04B 7/00* (2006.01)

(52) U.S. Cl. ......... 455/69; 455/63.1; 455/450; 455/509; 455/67.13; 455/114.2; 455/101; 370/328; 370/329; 370/341; 375/260; 375/267; 375/347

(58) Field of Classification Search ............... 455/69, 455/63.1, 450, 67.13, 509, 114.2, 101
See application file for complete search history.

(56) References Cited

U.S. PATENT DOCUMENTS

| 7,236,748 B2* | 6/2007 | Li et al. ..................... 455/69 |
| 7,248,638 B1* | 7/2007 | Banister ..................... 375/267 |
| 7,336,727 B2* | 2/2008 | Mukkavilli et al. ......... 375/299 |
| 7,573,945 B2* | 8/2009 | Tesfai et al. ................ 375/267 |
| 7,710,319 B2* | 5/2010 | Nassiri-Toussi et al. .... 342/377 |
| 7,787,553 B2* | 8/2010 | Prasad et al. ............... 375/267 |
| 7,852,802 B2* | 12/2010 | Prasad et al. ............... 370/328 |
| 8,014,460 B2* | 9/2011 | Prasad et al. ............... 375/267 |
| 8,073,068 B2* | 12/2011 | Kim et al. .................. 375/267 |
| 8,073,069 B2* | 12/2011 | Mundarath et al. ......... 375/267 |

OTHER PUBLICATIONS

I. Berenguer et al., "Adaptive MIMO Antenna Selection via Discrete Stochastic Optimization", IEEE Transactions on Signal Processing, vol. 53, No. 11, pp. 4315-4329, Nov. 2005.
C. H. Doan et al., "Design Considerations for 60 GHz CMOS Radios", IEEE Communications Magazine, pp. 132-140, 2004.
M. Gharavi-Alkhansari et al., "Fast Antenna Subset Selection In MIMO Systems", IEEE Transactions on Signal Processing, vol. 52, No. 2, pp. 339-347, Feb. 2004.
A. Gorokhov, et al., "Receive Antenna Selection for MIMO Flat-Fading Channels: Theory and Algorithms", IEEE Transactions on Signal Processing, vol. 51, No. 11, pp. 2796-2807, Nov. 2003.
IEEE Computer Society, 802.15.3 "Wireless Medium Access Control (MAC) and Physical Layer (PHY) Specifications for High Rate Wireless Personal Area Networks (WPANs)", 203 pages, Oct. 2009.

(Continued)

*Primary Examiner* — Marceau Milord
(74) *Attorney, Agent, or Firm* — James Bitetto; Joseph Kolodka

(57) ABSTRACT

Systems and methods for joint training of beam patterns in a system having a transmitter and a receiver. Initial transmit and receive beam pattern vectors are first selected. The beam pattern vectors are perturbed to produce a plurality of perturbed transmit and receive beam pattern vectors. A received signal power between the transmitter and the receiver is estimated for each combination of the perturbed transmit and the perturbed receive beam pattern vectors. The transmit and receive beam pattern vectors having a highest received signal power are applied to the transmitter and the receiver respectively. The perturbation, estimation, and application steps are iterated until the received signal power meets a convergence criterion.

19 Claims, 5 Drawing Sheets

OTHER PUBLICATIONS

A. F. Molisch, et al., "Capacity of MIMO Systems With Antenna Selection", IEEE Transactions on Wireless Communications, vol. 4, No. 4, pp. 1759-1772, Jul. 2005.

J. Nsenga et al., "Comparison of OQPSK and CPM for Communications at 60 GHz with a Nonideal Front End", Hindawi Publishing Corporation, EURASIP Journal on Wireless Communications and Networking, vol. 2007, Article ID 86206, 14 pages.

A. A. M. Saleh et al., "A Statistical Model for Indoor Multipath Propagation" IEEE Journal on Selected Areas in Communications, vol. SAC-5, No. 2, pp. 128-137, Feb. 1987.

A. Seyedi, "Water-Filling Capacity of Wide Band 60GHz Channels with Antenna Directionality", 6 pages, 2007.

M. Vu et al., "Optimum Space-Time Transmission for a High K Factor Wireless Channel with Partial Channel Knowledge", Invited Paper, Wiley Journal on Wireless Communications and Mobile Computing, vol. 4, pp. 807-816, Nov. 2004.

X. Wang et al., "Stochastic Gradient Algorithms for Design of Minimum Error-Rate Linear Dispersion Codes in MIMO Wireless Systems", IEEE Transactions on Signal Processing, vol. 54, No. 4, pp. 1242-1255, Apr. 2006.

S, K. Yong et al., "An Overview of Multigigabit Wireless through Millimeter Wave Technology: Potentials and Technical Challenges", Hindawi Publishing Corporation, EURASIP Journal on Wireless Communications and Networking, vol. 2007, Article 1D 78907, 10 pages.

* cited by examiner

US 8,140,024 B2

FAST CONVERGENCE TO OPTIMAL BEAM PATTERNS

RELATED APPLICATION INFORMATION

This application claims priority to provisional application Ser. No. 61/221,275 filed on Jun. 29, 2009, incorporated herein by reference.

BACKGROUND

1. Technical Field

The present invention relates to beam steering and, in particular, to systems and methods which quickly determine a globally optimal beam pattern.

2. Description of the Related Art

60 GHz millimeter wave communication can provide data rates in the range of gigabits/sec. Wireless communication around 60 GHz benefits from a large amount of clean, unlicensed bandwidth (up to 7 GHz), compact size of the transceiver due to the short wavelength employed, and less interference as a result of increased atmospheric absorption as compared to other wavelengths. However, 60 GHz communication is strongly line-of-sight, such that obstructions (e.g., walls in an office space) can greatly hamper performance.

SUMMARY

A method for joint training of beam patterns in a system is shown having a transmitter and a receiver, including selecting initial transmit and receive beam pattern vectors; perturbing the beam pattern vectors to produce a plurality of perturbed transmit and receive beam pattern vectors; estimating a received signal power between a transmitter and a receiver for each combination of the perturbed transmit and the perturbed receive beam pattern vectors; applying the transmit and receive beam pattern vectors having a highest received signal power to the transmitter and the receiver respectively; and repeating said steps of perturbing, estimating, and applying until the received signal power meets a convergence criterion.

A method for selecting a subset of transmit antennas having a specified cardinality is shown in a system having two antenna arrays, including determining a plurality of beam pattern vectors for a first antenna array; transmitting a known sequence using each beam pattern vector; estimating a channel gain at the receiver for each choice of beam pattern vector; and computing an estimate of an array response vector and selecting a subset of the specified cardinality comprising indices such that the corresponding elements of the estimated array response vector are maximized.

A radio communication system is shown, including a transmitter array, comprising a plurality of component antennas, configured to transmit signals according to a first beam pattern; a receiver array, comprising a plurality of component antennas, configured to receive signals according to a second beam pattern; and a feedback link configured to communicate beam pattern information from the receiver to the transmitter, wherein the transmitter array trains the first beam pattern using the beam pattern information, wherein the transmitter array and the receiver array jointly train the first and second beam patterns.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
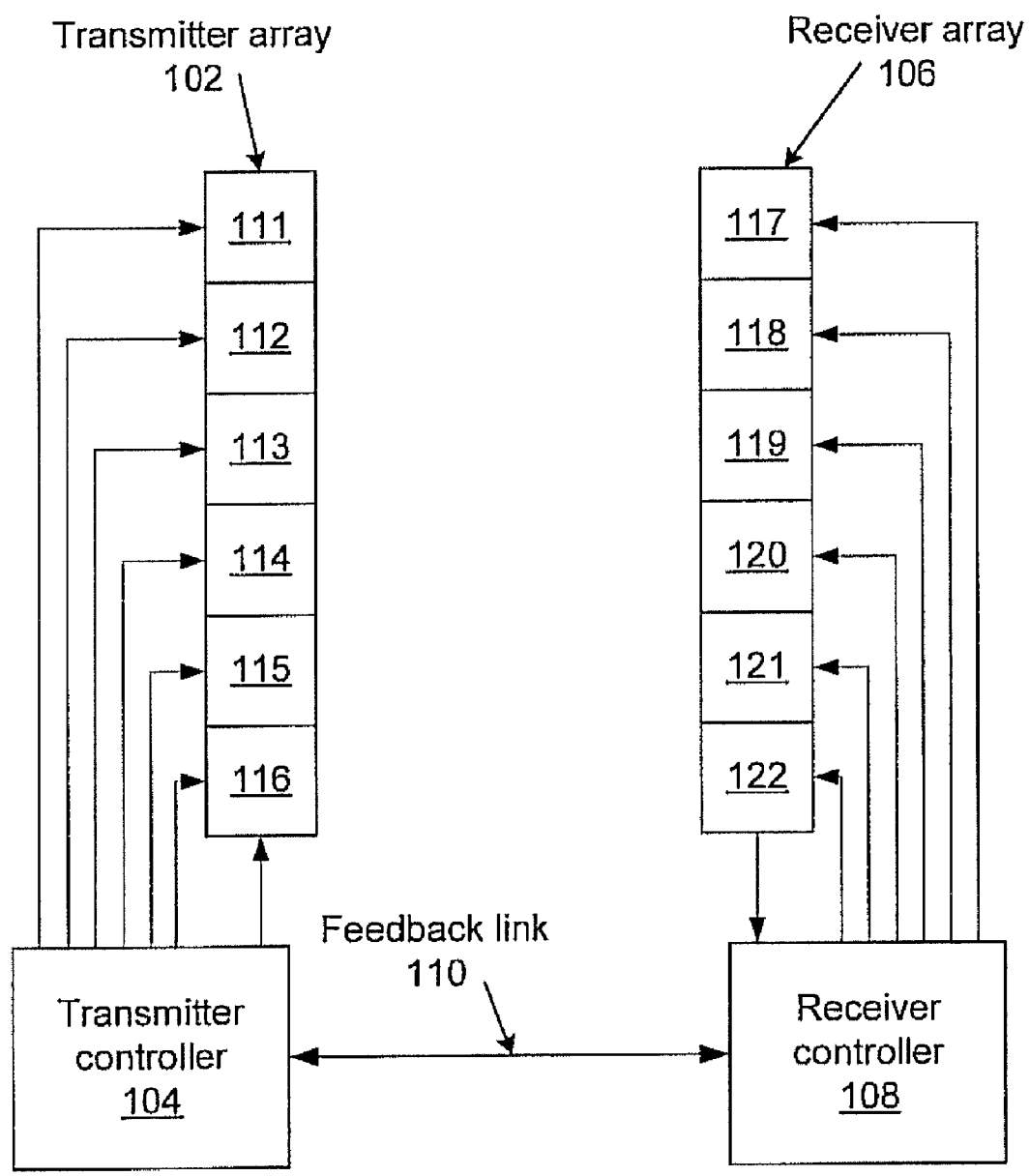
FIG. 1 shows a diagram of a multiple-input-multiple-output (MIMO) transmitter/receiver system according to the present principles.

A proposed 60 GHz Wireless Personal Area Network (WPAN) system is currently undergoing standardization within the IEEE Standards Committee 802.15. The present principles describe methods and systems for beam steering in radio communications systems which will allow 60 GHz devices to rapidly find an optimal beam pattern and antenna subset for use in maximizing signal strength despite line-of-sight obstructions, while still keeping component cost low.

Physical-layer characteristics of 60 GHz system for use in, e.g., a wireless personal area network (WPAN) include a large-scale multiple-input-multiple-output (MIMO) system (e.g., 32×32) and the use of both transmit and receive beamforming methods. To reduce the hardware complexity, the number of radio-frequency (RF) chains employed—each of which includes amplifiers, analog/digital converters, mixers, etc.—may be smaller than the number of antenna elements. An antenna selection method is then used to fully exploit the beamforming gain that is afforded by large-scale MIMO antennas. Knowing the MIMO channel matrix can be very helpful in antenna selection.

In 60 GHz WPAN systems, however, the receiver has no access to such a channel matrix. Instead, it can only access the scalar output of the receiving beamformer. A low-complexity antenna selection method is shown that exploits the strong line-of-sight property of the 60 GHz channel. A subspace-tracking-based adaptive method for transmit and receive beamforming is also shown that is applicable to any transmit and receive antenna subsets. The method makes use of a low-rate feedback channel to inform the transmitter about the preferred beams.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary transmission/reception system with beamforming is shown. A transmitter array 102 is made up of multiple individual transmitters 111-116. The transmitter array receives a common input from the transmitter controller 104 which passes to each of the individual transmitters in the array 102. Each individual transmitter in the array 102 also receives control information from the transmitter controller 104 that informs the individual transmitters of how to adjust the input to achieve a desired beam pattern, including whether each individual transmitter is active or not.

Similarly, a receiver array 106 is made up of multiple individual receivers 117-122. The receiver array produces a common output from the individual receivers in the array 106 that is the combined signal from each of the receivers, and sends it to a receiver controller 108. The receiver controller 108 provides control information to each of the receivers 107-122 that informs the individual receivers how to adjust their output to achieve a desired beam pattern, including whether each individual receiver is active or not. The transmitter controller 104 and the receiver controller 108 communicate over a feedback link 110 that allows them to share calibration information when finding an optimal beam pattern.

It can be difficult to determine an optimal beam pattern in a system of two wireless devices with directional antennas, such as that shown in FIG. 1. This is particularly the case for connectivity between radios that use center frequencies in the 57-64 GHz range (commonly referred to as "60 GHz radios"). At these high frequencies, communication using omni-directional antennas is not feasible. As such, directional antennas are used at one or both ends of the wireless link. Accurate beam steering and determining an optimal beam pattern greatly increases the effectiveness of such directional antennas for high-throughput connectivity.

By using arrays of antenna elements, it is possible to provide increased flexibility in terms of forming beam patterns. By applying different magnitudes and phases, also known as antenna weight vectors (AWVs), to these antenna elements, it is possible to form a wide variety of beam patterns. Such a system, which uses multiple arrays 102 and 106 at both the transmitting and receiving end, is referred to herein as a multiple-input-multiple-output (MIMO) system.

Figure 2:
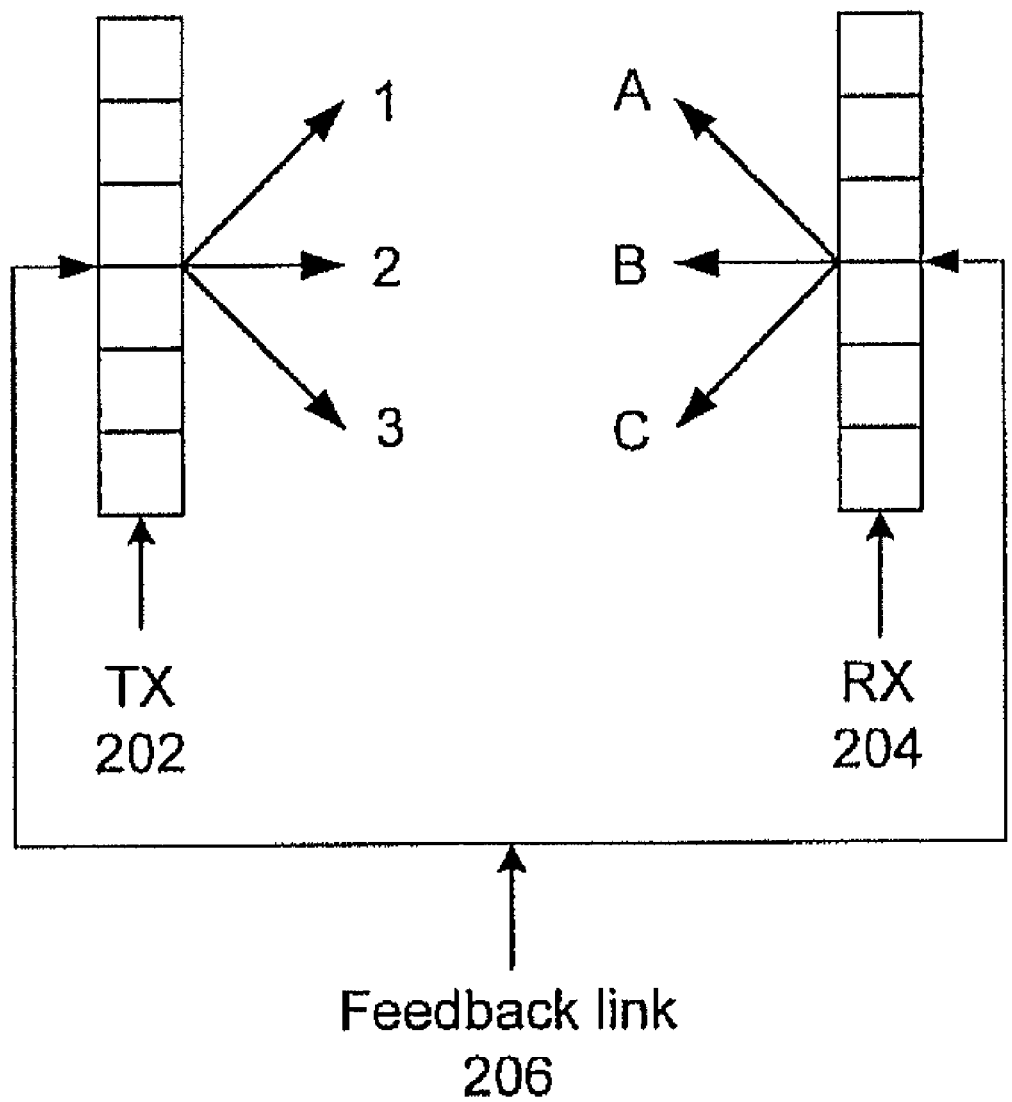
FIG. 2 shows a diagram of a MIMO system performing beamformer training.

One method of determining a beam pattern is alternate AWV training. Referring now to FIG. 2, alternate AWV training is shown using two antenna arrays. Alternate AWV training involves one communicating entity, either the transmitter 202 (TX) or the receiver 204 (RX) fixing its beam pattern while the other side tries out different beam patterns. For example, in FIG. 2, RX 204 fixes its beam pattern to option "A" while TX 202 tries out beam patterns "1", "2", and "3". While trying out these patterns TX 202 transmits a known sequence of bits. RX 204 then determines, using a pre-determined metric such as the signal strength of the received bits, which pattern gives the maximum performance. Once this is determined, RX 204 communicates the best beam pattern to TX 202 via feedback link 206. RX 204 then goes on to refine its pattern choice further by perturbing "A" to arrive at "Aa", "Ab", and "Ac". This iterative process continues until both sides are satisfied with the performance, for example by determining that the metric has exceeded some pre-determined threshold.

However, the alternate AWV training approach is susceptible to "AWV biasing." For example, in FIG. 2, although the AWV "2" for TX 202 and the AWV "B" for RX 204 are close to the optimal patterns, TX 202 will end up choosing the AWV "1" because RX 204 happened to start with the AWV "A". This is because, for each AWV, there is an optimal matching AWV on the other communicating entity that will give maximum performance. However, this match may not be the globally optimal AWV or pattern match. In FIG. 2, although AWV "1" and AWV "A" give better performance than AWV "2" and AWV "A", their performance is still lower than the pattern of AWV "2" and AWV "B".

This problem can be addressed by using joint training of AWVs at both ends. Consider FIG. 2 again in the context of joint training that involves both communicating entities trying out beam patterns simultaneously. While TX 202 tries the AWVs "1", "2", and "3", RX 204 tries the AWVs "A", "B", and "C". In this case, at the end of the first training period, RX 204 can arrive at the conclusion that the combination of AWVs "2" and "B" provides globally optimal performance. The refinement of the patterns can then continue similarly along these two AWVs.

Note that both joint and alternate AWV training assume that the TX 202 and RX 204 are synchronized, and have the ability to exchange information on how long an AWV or beam pattern should be used for. This information can be exchanged in the form of bits/bytes in communication frame headers that specify either how long an AWV should be used or how many times it should be repeated and is represented in FIG. 2 as the feedback link 206. For example, in FIG. 2, TX 202 can either specify that it is going to use AWV "1" for a particular duration (or repeat it) or RX 204 can request TX 202 to do so. If RX 204 knows in advance the duration that TX 202 is going to use AWV "1" or the number of times TX 202 will repeat AWV "1", it can then determine the number, and duration of the AWVs it plans to use simultaneously. Note that it may be possible for RX 204 to be unable to use ALL the AWVs within a single AWV duration. In this case, joint training will require multiple iterations. Also note that the devices can choose between alternate and joint AWV training using a bit/byte in the frame header. Due to the constantly changing nature of the wireless channel, this procedure of joint training should be repeated either periodically or in a triggered fashion.

The present principles provide a method for quickly converging to a globally optimal beam pattern. Consider a MIMO system, such as those shown in FIGS. 1 and 2, with $N_t$ transmitting antennas and $N_r$ receiving antennas operating, e.g., in the 60 GHz band. Although the present principles are described with respect to 60 GHz systems, this description is intended solely for the purpose of illustration and is not meant to be limiting in any way.

The radio wave propagation at 60 GHz suggests the existence of a strong line-of-sight (LOS) component as well as the existence of multi-cluster multipath components due to the high path loss and an inability to bend around obstacles. A simplified channel model without time or angle statistics is used below for the purposes of illustration, and this model is not intended to be limiting. The exemplary model is characterized by a set of flat-fading Rician distributed random variables $$H \in \mathbb{C}^{N_r \times N_t}, \qquad (1)$$

where the entries of H represent complex-valued channel gains between the transmit and receive antennas, modeled by independent symmetric complex Gaussian random variables with non-zero means and unit variances, i.e., $$h_{ij} \sim \mathbb{CN}(\mu_{ij}, 1/(K+1)). \qquad (2)$$

The mean values $\mu_{ij}$ represent the deterministic LOS component while the channel fluctuations (non-LOS components) are modeled by the random part of the channel matrix. Hence, $$H = \sqrt{\frac{1}{K+1}} H_{NLOS} + \sqrt{\frac{K}{K+1}} H_{LOS},$$

where a Rician K factor is defined as the power ratio between $H_{LOS}$ and $H_{NLOS}$ to indicate the relative strength. K=10 dB is an exemplary assumption for modeling the wireless channel at 60 GHz. Moreover, in many instances the LOS component can be modeled as being a rank-1 matrix, e.g., $H_{LOS}=ab^H$, where a and b are $N_r \times 1$ and $N_t \times 1$ vectors, respectively and $(\cdot)^H$ denotes the conjugate transpose operator.

It can be assumed that the numbers of transmit and receive antennas in the respective transmit and receive arrays 102 and 106, i.e., $N_t$ and $N_r$, are large. However, the numbers of available radio-frequency (RF) chains at the transmitter and receiver, $n_t$ and $n_r$, are much smaller, such that $n_t \ll N_t$ and $n_r \ll N_r$. Hence one may choose a subset of $n_t \times n_r$ transmit and receive antennas 202 and 204 out of the original $N_t \times N_r$ MIMO system and employ these selected antennas for data transmission. Denote ω as the set of indices corresponding to the chosen $n_t$ transmit antennas 202 and $n_r$ receive antennas 204, and denote $H_\omega$ as the submatrix of the original MIMO channel matrix H corresponding to the chosen antennas.

For data transmission over the chosen MIMO system $H_\omega$, a transmit beamformer $v=[v_1, v_2, \ldots, v_{n_t}]^T$, with unit norm $\|v\|=1$, is employed. This vector describes the relative adjustments applied to each of the selected transmitting antennas 202 to create the desired beam pattern. The received signal is then given by $$r = \sqrt{\rho} H_\omega v s + n, \qquad (3)$$

where s is the transmitted data symbol; ρ is the average signal-to-noise ratio (SNR) at each receive antenna; and n~ $\mathbb{CN}(0,I)$ is an additive white Gaussian noise vector. At the receiver 204, a receiver beamformer $u=[u_1, u_2, \ldots, u_{n_r}]^T$, with $\|u\|=1$, is applied to the received signal r. As above with the transmitter beamformer v, the receiver beamformer u is a normalized vector which describes the relative adjustments to the receiver antennas that are used to direct the sensitivity of the receiver device. This produces a receiver output of $$y(\omega, v, u) = u^H r = \sqrt{\rho} u^H H_\omega v s + u^H n. \qquad (4)$$

For a given antenna subset ω and known channel matrix $H_\omega$, the optimal transmit beamformer v and receive beamformer u (optimal in the sense of maximum received SNR) are given respectively by the right and left singular vectors of $H_\omega$ corresponding to the principal singular value $\sigma_1(H_\omega)$. The optimal antenna subset $\hat{\omega}$ is then given by the antennas whose corresponding channel submatrix has the largest principal singular value. Letting S be a set, each element of which corresponds to a particular choice of $n_t$ transmit antennas and $n_r$ receive antennas, produces $$\hat{\omega} = \underset{\omega \in S}{\operatorname{argmax}} \sigma_1(H_\omega) \qquad (5)$$

One variation to the above antenna selection problem is that, instead of the numbers of available RF chains ($n_t, n_r$), a minimum performance requirement is used, e.g., $\sigma_1 \geq v$. This raises the question of finding the antenna subset with the minimum size such that its performance meets the minimum performance requirement. Finding the antenna set with the minimum size equates to computing the optimal antenna set $\hat{\omega}$ and the corresponding transmit and receiver beamformers v and u for a given MIMO channel realization H. However, for the system under consideration, H is not available. Instead, the system only has access to the receive beamformer output y(ω,v,u). This makes the straightforward approach of computing the singular value decomposition of $H_\omega$ to obtain the beamformers difficult. Furthermore, the brute-force approach to antenna selection in (5) involves an exhaustive search over $$\binom{N_t}{n_t} \binom{N_r}{n_r}$$

possible antenna subsets, which is computationally expensive.

Figure 5:
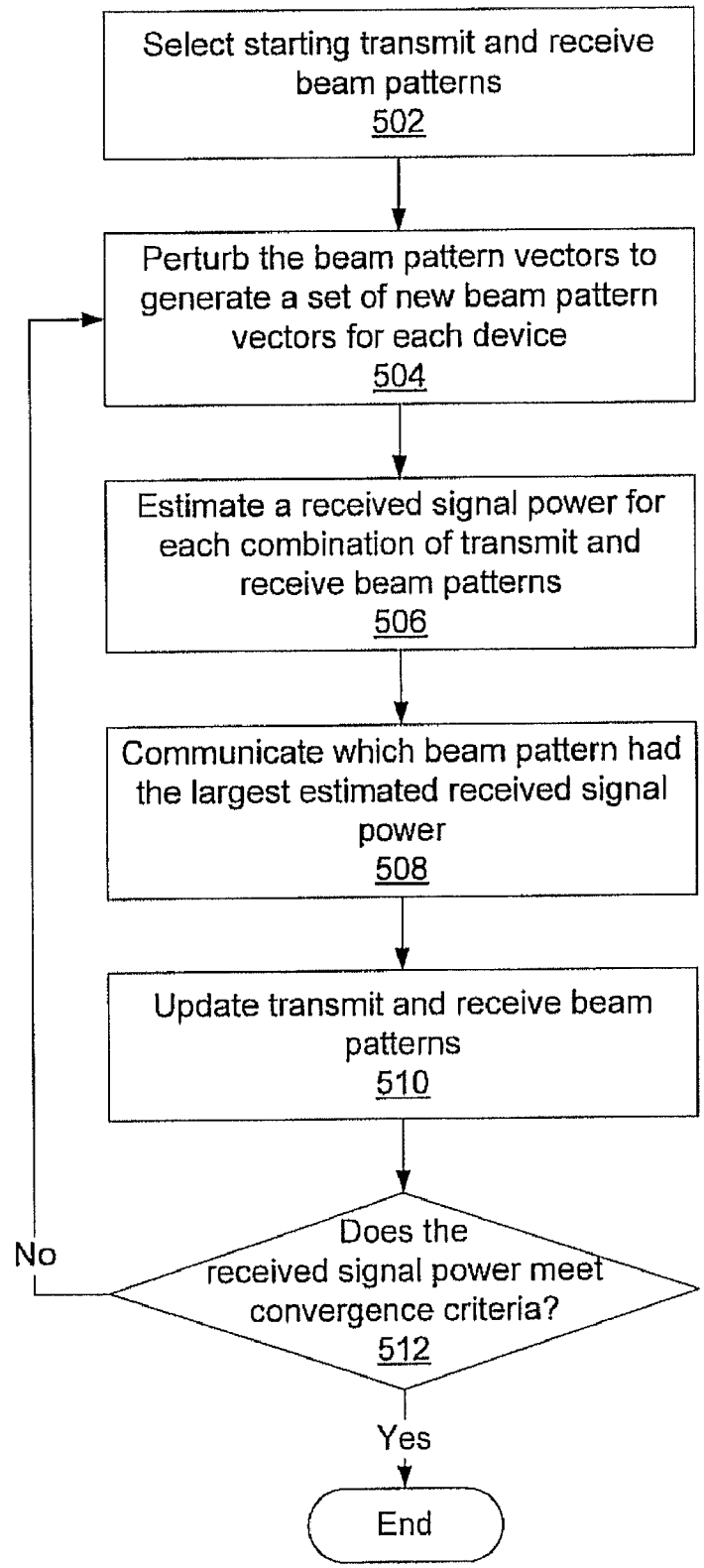
FIG. 5 shows a block/flow diagram illustrating a method for joint beamformer training according to the present principles.

Referring now to FIG. 5, an outline of a two-stage solution to the above problem of joint antenna selection and transmit-receive beamformer adaptation is shown. The first stage of antenna selection includes setting the transmit and receive beamformers to estimated starting values 502. This method uses an estimate of the principal singular value of $H_\omega$ corresponding to the current antenna subset ω that is accurate when the LOS component is rank-1 and the K factor is large. An ω that maximizes the estimate is then computed. Once the antenna subset ω is selected, in the second stage, the transmit and receive beamformers v and u are iteratively updated using a subspace-tracking method in blocks 504-512. At each iteration some feedback bits are transmitted from the receiver to the transmitter via a low-rate feedback channel to inform the transmitter about the preferred transmit beamformer. Beamformer selection will be described in more detail below.

The following operates under the assumption that one can only observe y(ω,v,u) in (4), which is a noisy function of the channel submatrix $H_\omega$. On the other hand, the objective function to be maximized for antenna selection is the principal singular value of $H_\omega$ as in (5). Using a hypothetical function $\phi(\cdot)$ of y such that it is an unbiased estimate of $\sigma_1(H_\omega)$, the antenna selection equation (5) can be rewritten as $$\hat{\omega} = \underset{\omega \in S}{\operatorname{argmax}} E\{\phi(y(\omega, v, u))\}. \tag{6}$$

When the K factor is high and the LOS component can be modeled as being a rank-1 matrix, $H \approx H_{LOS} = ab^H$ (a likely scenario at 60 GHz), where the vectors a and b can be regarded as receiver and transmitter array response vectors corresponding to the LOS component. Let $\pi_r(\cdot)$ and $\pi_t(\cdot)$ be permutation operators such that $|a_{\pi_r(1)}| \geq |a_{\pi_r(2)}| \ldots \geq |a_{\pi_r(N_r)}|$ and $|b_{\pi_t(1)}| \geq |b_{\pi_t(2)}| \ldots \geq |b_{\pi_t(N_t)}|$. Then the $n_r \times n_t$ sub-matrix of $ab^H$ that has the largest maximum singular value among all $n_r \times n_t$ sub-matrices, is obtained by choosing receive antennas with indices $\pi_r(1), \ldots, \lambda_r(n_r)$ and transmit antennas with indices $\pi_t(1), \ldots, \pi_t(n_t)$. The following method seeks to determine this subset based on the noisy observations that are available at the receiver.

Figure 3:
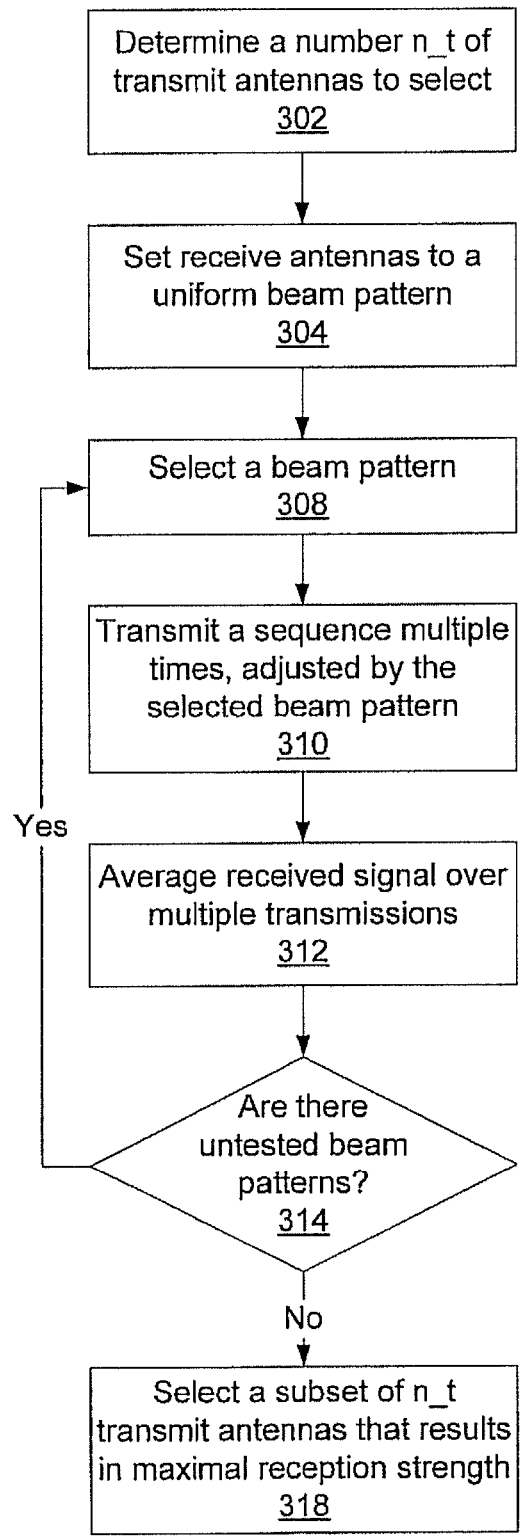
FIG. 3 shows a block/flow diagram illustrating a method for selecting a transmit antenna subset according to the present principles.

Referring now to FIG. 3, a method for selecting a subset of transmit antennas is shown. At block 302, a number $n_t$ of transmit antennas is determined which may be used, e.g., due to a number of available RF chains. This number $n_t$ represents the cardinality of the antenna subset. As noted above, it is assumed that only the receive beamformer output $y(\omega,v,u)$ in (4) is available. At block 304, the receive beamformer is set to be a normalized length $N_r$ vector of all ones $$u = \frac{1}{\sqrt{N_r}} \mathbf{1}.$$

Alternatively, any unit-norm vector u can be employed as the receive beamformer. The $N_t$ transmit beamformers $\{v_j\}_{j=1}^{N_t}$ are the columns of a $N_t \times N_t$ discrete Fourier transform (DFT) matrix $V = [v_1, \ldots, v_{N_t}]$. Alternatively, the $N_t$ transmit beamformers $\{v_j\}_{j=1}^{N_t}$ can be the unit-norm columns of any $N_t \times N_t$ invertible matrix. A beamformer is selected at block 308. The transmit array then transmits a test sequence, adjusted by the selected beamformer in block 310. To mitigate the noise, for each transmit beamformer $v_k$, M transmissions are made such that the corresponding receive beamformer outputs as $y(k)^{(m)}$, $m=1, \ldots, M$, where k is identifies the beamformer being used. This leads to the computation of $$\tilde{y}(k) = \frac{1}{M} \sum_{m=1}^{M} y(k)^{(m)}, \tag{7}$$

which averages the received signals across all M transmissions in block 312. This is repeated for different beamformers until block 314 determines that no beamformers remain untested. The gains $\{\tilde{y}(k)\}$ can be fed-back to the transmitter. If all of the beamformers have been tried, an antenna subset is selected in block 318.

Setting $\tilde{y} = [\tilde{y}(1), \ldots, \tilde{y}(N_t)]$ for a unitary matrix V produces $$\tilde{z} = [\tilde{z}_1, \ldots, \tilde{z}_{N_t}] = \tilde{y}V^H. \tag{8}$$

Note that, in the absence of noise, equation (8) reduces to $\tilde{z} = \gamma b^H$, where $\gamma$ is a scalar independent of b. The vector $\tilde{z}$ is an estimate of the transmit array response vector. For a non-unitary matrix V, the estimate vector $\tilde{z}$ can be determined as $\tilde{z} = [\tilde{z}_1, \ldots, \tilde{z}_{N_t}] = \tilde{y}V^{-1}$ or $\tilde{z} = [\tilde{z}_1, \ldots, \tilde{z}_{N_t}] = \tilde{y}F$ where F is a suitable linear transformation matrix that depends on V and the noise-variance at the receiver. A permutation $\hat{\pi}_t(\cdot)$ of $\{1, \ldots, N_t\}$ can then be determined such that $|\tilde{z}_{t(1)}| \geq |\tilde{z}_{t(2)}| \ldots \geq |\tilde{z}_{t(N_t)}|$. The transmitter indices are $\hat{\pi}_t(1), \ldots, \hat{\pi}_t(n_t)$. The transmit antenna indices can also be determined corresponding to the $n_t$-largest magnitudes among $\{|\tilde{z}_k|\}_{k=1}^{N_t}$.

Figure 4:
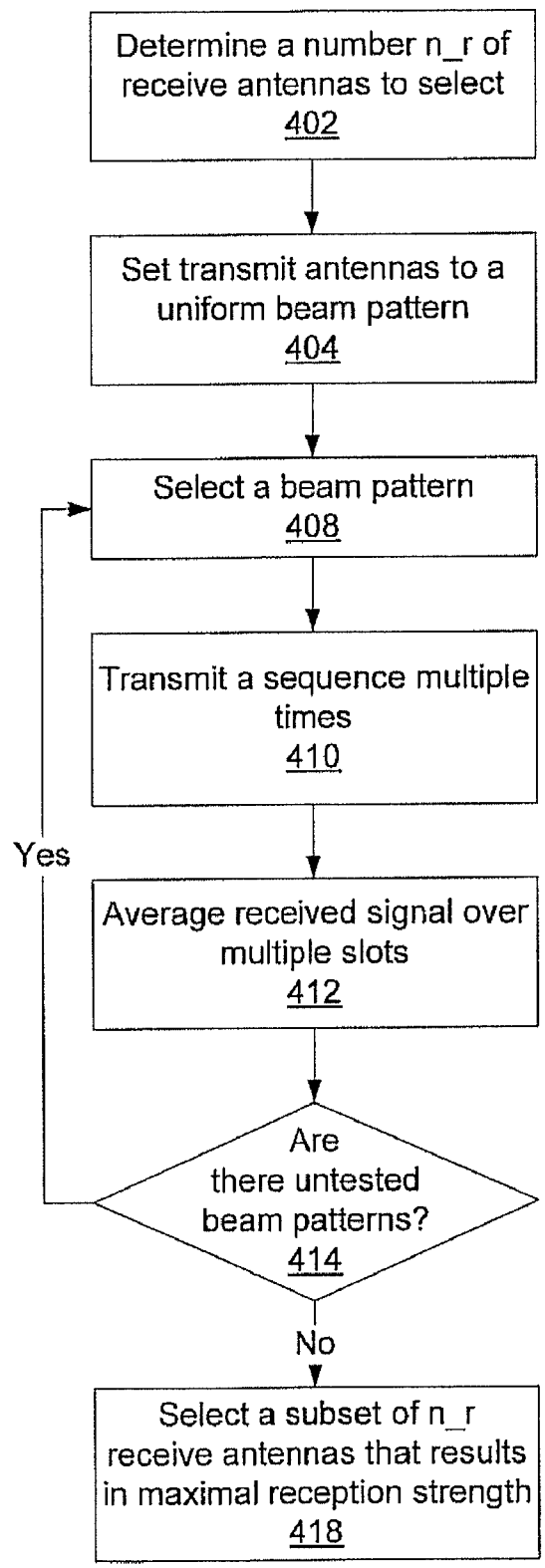
FIG. 4 shows a block/flow diagram illustrating a method for selecting a receive antenna subset according to the present principles.

Referring now to FIG. 4, a method for determining a subset of receive elements is shown. At block 402 a number $n_r$ of antennas to select is determined. This number $n_r$ represents the cardinality of the antenna subset. At block 404 the transmit beamformer is set to be the normalized $n_t$ length vector of all ones $$v = \frac{1}{\sqrt{n_t}} \mathbf{1}.$$

The selected transmit antenna subset transmits using this beamformer for NJ consecutive time intervals (slots). The receiver now employs $N_r$ receive beamformers $\{u_j\}_{j=1}^{N_r}$ that are the columns of a $N_r \times N_r$ discrete Fourier transform (DFT) matrix $U = [u_1, \ldots, u_{N_r}]$. A receive beamformer is selected at block 408. Each receive beamformer is used for J slots, where $\{y'(k)^{(m)}\}_{m \in I_k}$ denotes the outputs when the receive beamformer $u_k$ is used and where $I_k$ contains the indices of the slots when this receiver beamformer is used. A sequence is transmitted in block 410 across J slots. The received signal is averaged across the J slots to produce $$\tilde{e}(k) = \frac{1}{J} \sum_{m \in I_k} y'(k)^{(m)}. \tag{9}$$

This is repeated for each receive beamformer until block 414 determines that there are no beamformers remaining untested. If all of the beamformers have been tried with all of the antennas, an antenna subset is selected in block 418.

Next, setting $\tilde{e} = [\tilde{e}(1), \ldots, \tilde{e}(N_r)]^T$ produces $$\tilde{f} = [\tilde{f}_1, \ldots, \tilde{f}_{N_r}]^T = U\tilde{e} \tag{10}$$

Note that, in the absence of noise, $\tilde{f} = \gamma' a$ where $\gamma'$ is a scalar independent of a. The permutation $\{1, \ldots, N_r\}$ can then be computed such that $|\tilde{f}_{r(1)}| \geq |\tilde{f}_{r(2)}| \ldots \geq |\tilde{f}_{r(N_r)}|$. Transmitter indices are chosen as $\hat{\pi}_r(1), \ldots, \pi_r(n_r)$. Note that the transmit antenna indices can instead be determined as corresponding to the $n_r$-largest magnitudes among $\{|\tilde{f}_k|\}_{k=1}^{N_r}$.

Referring now to FIG. 5, a method for selecting a pair of good transmit and receive beam-farmers, v and u, is described, where the transmit and receive antenna subsets are specified. Let H denote the channel matrix corresponding to the specified subsets. As described above, v and u are chosen to maximize the received SNR, or alternatively, to maximize the power of the receive signal power $|u^H H v|^2$ so that $$(\hat{v}, \hat{u}) = \arg \max_{v \in C^{n_t}, \|v\|=1; u \in C^{n_r}, \|u\|=1} |u^H H v|^2. \tag{15}$$

Since the channel matrix H is not available and only a noise output $$y(v,u) = \sqrt{\rho} u^H H v s + u^H n \tag{16}$$

is available, the beamformers may be updated as follows.

At block 502, starting transmit and receive beamformers (v,u) are selected. Block 504 begins a loop by generating K' perturbation vectors for the transmit beamformer, $p_j \sim \mathcal{CN}(0,I)$, $j=1, \ldots, K'$, and $M'$ perturbation vectors for the receive beamformer, $q_i \sim \mathcal{CN}(0,I)$, $i=1, \ldots, M'$. At block 506, for each of the normalized perturbed transmit-receive beamformer pairs $$\left( v'_j = \frac{v + \beta p_j}{\|v + \beta p_j\|}, u'_i = \frac{u + \beta q_i}{\|u + \beta q_i\|} \right), \quad (17)$$

where $\beta$ is a step-size parameter, the corresponding received output signal power for that combination of beamformers is measured. In addition, the received output signal power for the combination of either another perturbed pair generated as in (17) or the unperturbed beamformer pair (v,u) is measured. One approach to measuring the received output signal power is to compute $\Sigma_{m=2}^{Q}(y(v'_j,u'_i)^{(l)})^H y(v'_j,u'_i)^{(m)}$, where Q is the number slots over which the pair $v'_j$, $u'_i$ is used. The transmitter is informed about the preferred transmit beamformer by a $\lceil \log(K'+1) \rceil$-bit message from the receiver at block 508. At block 510, the beamformers are updated using the perturbation vector pair that gives the largest output signal power at the receiver. Decision block 512 determines whether the received signal power of the current beamformers meets selection criteria. If not, the process returns to block 504 and new perturbations are generated. If the received power does meat the selection criteria, the process ends and the current beamformers are used.

As an exemplary convergence criterion, convergence can be checked by considering the difference in the highest received signal powers between successive rounds. In this way, the process can be halted when further updates reach a point of diminishing returns. Another exemplary convergence criterion includes determining whether the received signal power exceeds a predetermined minimum strength.

When implementing joint beamformer training, a good initialization can considerably speed up the convergence when compared with random initialization. Given that the channel consists of a deterministic LOS component $H_{LOS}$ and a random component, when the K factor is high, the LOS component mostly determines the largest singular mode. As such, it is possible to initialize the transmit and receive beamformers as the right and left singular vectors of $H_{LOS}$ respectively. The right and left singular vectors of $H_{LOS}$ can in turn be approximately determined by a sector sweep.

Since both v and u have unit norms, they can be represented using spherical coordinates. Consider $v=[v_1, v_2, \ldots, v_{n_t}]^T$ as an example. Expanding $\tilde{v}=[\text{Re}\{v^T\},\text{Im}\{v^T\}]^T$, it is equivalent to a point on the surface of the $2n_t$-dimensional unit sphere. Thus, $\tilde{v}$ can be parameterized by $(2n_t-1)$-dimensional vector $\psi$ as follows:

$$\tilde{v}_1 = \cos\psi_1, \quad (18)$$

$$\tilde{v}_2 = \sin\psi_1 \cos\psi_2, \quad (19)$$

$$\vdots$$

$$\tilde{v}_{2n_t-1} = \sin\psi_1 \sin\psi_2 \ldots \sin\psi_{2n_t-2}\sin\psi_{2n_t-1}, \quad (20)$$

$$\tilde{v}_{2n_t} = \sin\psi_1 \sin\psi_2 \ldots \sin\psi_{2n_t-2}\sin\psi_{2n_t-1}, \quad (21)$$

$$0 < \psi_i < \pi, 1 \le i \le 2n_t - 2; \text{ and } 0 < \psi_{2n_t-1} \le 2\pi. \quad (22)$$

Given the vector $\tilde{v}$, or equivalently $\psi$, to obtain a new perturbed weight vector near $\tilde{v}$, an arbitrarily small $\epsilon > 0$ can be set and used to generate random variables $\{\delta_i\}_{i=1}^{2n_t-2}$ which are uniformly distributed within $$[-\frac{\epsilon}{2}, \frac{\epsilon}{2}],$$

as well as another independent uniform random variable $\delta_{2n_t-1} \in [\epsilon,\epsilon]$. Then, the new parameters are obtained within some predefined boundaries, given by $$\hat{\psi}_i = [\psi_i + \delta_i]_{a_i}^{b_i}, 1 \le i \le 2n_t-1, \quad (23)$$

where $[x]_a^b$ denotes that x is confined in the interval of [a,b], e.g., $[x]_a^b = x$ if $a \le x \le b$, $[x]_a^b = b$ if $x > b$, and $[x]_a^b = a$ if $x < a$. As a result, uniform search for the better weight vector is confined within a fixed space defined by $[a_i, b_i]$; $1 \le x \le 2n_t-1$ and the range of the perturbation depends on the definition of $\{\delta_i\}$. For example, given a good initialization, the current weight vector maybe very close to the optimizer, it is necessary to set a smaller search region and a finer perturbation.

In some embodiments, it is preferable to use transmit beam-formers that have all elements of equal magnitude. In particular, each transmit beamformer $v=[v_1, \ldots, v_{n_t}]^T$ may have $|v_i|=1/\sqrt{n_t}$, $i=1, \ldots, n_t$. Each such constant magnitude vector v is determined by the phases of its elements and hence is parameterized by a vector $\theta=[\theta_1, \ldots, \theta_{n_t}]^T$ such that $$v_i = \frac{\exp(\theta_i)}{\sqrt{n_t}},$$

$i=1, \ldots, n_t$. Given a constant magnitude vector v, or equivalently $\theta$, to obtain a new perturbed constant magnitude vector near v, one can set arbitrarily small $\{\epsilon_i > 0\}_{i=1}^{n_t}$ and generate random variables $\{\delta_i\}_{i=1}^{n_t}$ which are uniformly distributed within $$[-\frac{\epsilon_i}{2}, \frac{\epsilon_i}{2}],$$

respectively. Then, the new parameters are obtained as $$\hat{\theta}_i = [\theta_i + \delta_i]_0^{2\pi}, i=1, \ldots, n_t. \quad (24)$$

The new beamformer is obtained as $$\hat{v} = \left[ \frac{\exp(\hat{\theta}_1)}{\sqrt{n_t}}, \ldots, \frac{\exp(\hat{\theta}_{n_t})}{\sqrt{n_t}} \right]^T.$$

Since at each iteration, the best beamformer pair is chosen out of $(K'+1)(M'+1)$ combinations based on the corresponding estimated received signal powers, it would require $(K'+1)(M'+1)$ transmissions to test. In practice, instead of switching to different receive beamformers and making the corresponding transmissions for each transmit beamformer, one can set up $M'+1$ parallel receiver beamformers to obtain $M'+1$ receiver outputs simultaneously.

If all candidate $K'+M'+2$ beamformers at each iteration are generated anew, then the method is termed aggressive. On the other hand, a conservative strategy keeps the best transmit and receive beamformers from the previous iteration and generates $K'$ new transmit and $M'$ new receive beamformers for the current iteration. With a fixed step-size and a single feedback bit, the advantage of the aggressive update is a quicker convergence. But with multiple feedback bits, such an advantage is less significant. Therefore, a conservative update embodiment often produces better performance upon convergence.

Having described preferred embodiments of systems and methods for antenna selection and joint training (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for joint training of beam patterns in a system having a transmitter and a receiver, comprising:
    selecting initial transmit and receive beam pattern vectors;
    perturbing the beam pattern vectors to produce a plurality of perturbed transmit and receive beam pattern vectors;
    estimating a received signal power between a transmitter and a receiver for each combination of the perturbed transmit and the perturbed receive beam pattern vectors;
    applying the transmit and receive beam pattern vectors having a highest received signal power to the transmitter and the receiver respectively; and
    producing globally optimal transmit and receive beam patterns by repeating said steps of perturbing, estimating, and applying until the received signal power meets a convergence criterion.

2. The method of claim 1, wherein the convergence criterion is met when the difference between the highest received signal powers of successive iterations falls below a threshold.

3. The method of claim 1, wherein the convergence criterion is met when the highest received signal power exceeds a minimum requirement.

4. The method of claim 1, wherein the beam patterns are perturbed as $$\left( v'_j = \frac{v + \beta p_j}{\|v + \beta p_j\|},\ u'_j = \frac{u + \beta q_i}{\|u + \beta q_i\|} \right),$$

where $v'_j$ is the perturbed version of beam pattern v, $p_j$ is a set of perturbation vectors for the transmit beam pattern, $u'_i$ is the perturbed version of beam pattern u, $q_i$ is a set of perturbation vectors for the receive beam pattern, and $\beta$ is a step-size parameter.

5. The method of claim 1, wherein the initial transmit and receive beam pattern vectors are right and left singular vectors respectively of an estimated deterministic line-of-sight component of a transmission channel.

6. The method of claim 1, further comprising communicating the estimated transmit beam pattern vector having the highest received signal power to the transmitter.

7. The method of claim 1, further comprising selecting a subset of transmit and receive antennas to use corresponding to a number of radio-frequency chains.

8. A method for selecting a subset of antennas for a first antenna array having a specified cardinality in a system having two antenna arrays, comprising:
    determining a plurality of beam pattern vectors for a first antenna array;
    transmitting a known sequence using one or more beam pattern vectors;
    estimating a channel gain at the receiver for each choice of beam pattern vector; and
    computing an estimate of an array response vector and selecting a subset of the specified cardinality comprising indices such that the corresponding elements of the estimated array response vector are maximized.

9. The method of claim 8, further comprising selecting a beam pattern vector for a second antenna array to use when transmitting the known sequence.

10. The method of claim 9, wherein the first antenna array is a transmit array and the second antenna array is a receive array.

11. The method of claim 9, wherein the first antenna array is a receive array and the second antenna array is a transmit array.

12. The method of claim 9, wherein the beam pattern vector for the second antenna array is a normalized vector of all ones.

13. The method of claim 8, wherein the cardinality of the subset corresponds to a number of radio-frequency chains.

14. The method of claim 8, wherein the step of transmitting is repeated at least once for each transmit beam pattern vector.

15. The method of claim 14, wherein the channel gain for each transmit beam pattern vector is estimated by averaging a received power across the repeated transmissions for that transmit beam pattern vector.

16. A radio communication system, comprising:
    a transmitter array, comprising a plurality of component antennas, configured to transmit signals according to a first beam pattern;
    a receiver array, comprising a plurality of component antennas, configured to receive signals according to a second beam pattern; and
    a feedback link configured to communicate beam pattern information from the receiver to the transmitter, wherein the transmitter array trains the first beam pattern using the beam pattern information,
    wherein the transmitter array and the receiver array jointly train the first and second beam patterns.

17. The system of claim 16, wherein the first and second beam patterns are simultaneously trained with an iterative process.

18. The system of claim 16, wherein a subset of the transmitter array component antennas are selected that maximize elements of an estimated array response vector.

19. The system of claim 16, wherein a subset of the receiver array component antennas are selected that maximize elements of an estimated array response vector.

* * * * *